United States Patent [19]

Fujita

[11] 4,220,808
[45] Sep. 2, 1980

[54] MOUNTING DEVICE FOR COMPACT APPARATUS

[75] Inventor: Teizo Fujita, Ibaraki, Japan

[73] Assignee: Izumi Denki Corporation, Osaka, Japan

[21] Appl. No.: 879,529

[22] Filed: Feb. 21, 1978

[30] Foreign Application Priority Data

| Feb. 24, 1977 | [JP] | Japan | 52-20009 |
| Mar. 10, 1977 | [JP] | Japan | 52-26689 |
| Nov. 24, 1977 | [JP] | Japan | 52-141365 |
| Dec. 15, 1977 | [JP] | Japan | 52-152249 |
| Nov. 24, 1977 | [JP] | Japan | 52-158162[U] |
| Nov. 24, 1977 | [JP] | Japan | 52-158163[U] |
| Nov. 26, 1977 | [JP] | Japan | 52-159062[U] |
| Dec. 20, 1977 | [JP] | Japan | 52-173376[U] |
| Dec. 20, 1977 | [JP] | Japan | 52-173377[U] |
| Dec. 29, 1977 | [JP] | Japan | 52-177506[U] |
| Dec. 29, 1977 | [JP] | Japan | 52-177507[U] |
| Jan. 7, 1978 | [JP] | Japan | 53-592[U] |

[51] Int. Cl.² .................................. H05K 5/02
[52] U.S. Cl. .................................. 174/48; 200/296; 248/27.3; 339/128
[58] Field of Search ............. 174/48, 58, 65 R, 153 R, 174/153 G; 200/296, 295; 248/27.1, 27.3; 339/128; 285/162

[56] References Cited

U.S. PATENT DOCUMENTS

| 2,891,103 | 6/1959 | Swengel | 339/128 X |
| 3,243,206 | 3/1966 | Samer | 285/162 |
| 3,432,802 | 3/1969 | Ritchie | 339/128 |
| 3,681,593 | 8/1972 | Genovese et al. | 248/27.3 X |
| 3,770,925 | 11/1973 | Nelson et al. | 200/296 |
| 3,941,965 | 3/1976 | Piber | 200/296 |
| 3,971,908 | 7/1976 | Piber | 200/296 |

Primary Examiner—B. A. Reynolds
Assistant Examiner—D. A. Tone
Attorney, Agent, or Firm—Pollock, Vande Sande & Priddy

[57] ABSTRACT

The present invention is directed to a unique device for mounting electrical apparatus to a wall panel, wherein the device includes a main body portion having a cavity for holding components of the electrical apparatus and a pillar-shaped portion attached to the main body portion and extending through an opening in the wall panel. A free end of the pillar-shaped portion includes a plurality of outwardly protruding steps which overlap the wall panel, with a first set of the steps having a first axial length and a second set of the steps having a second, shorter axial length. A biasing member extends between the main body portion and the wall panel and biases the wall panel into contact with only the first set of steps, creating a gap between the wall panel and the second set of steps. A cover member surrounds the free end of the pillar-shaped portion and extends into the gap, with the second set of steps biasing the cover into contact with the wall panel.

37 Claims, 42 Drawing Figures

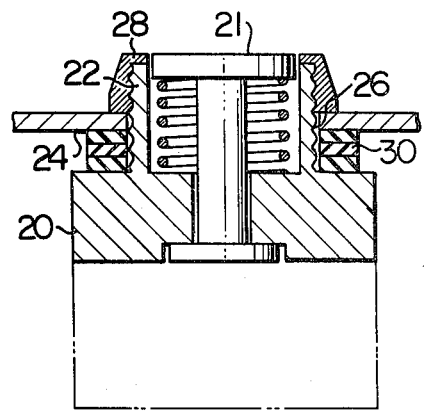
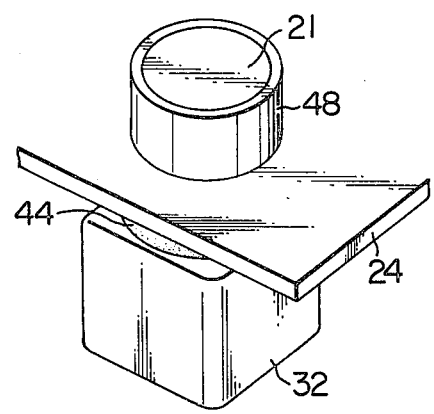
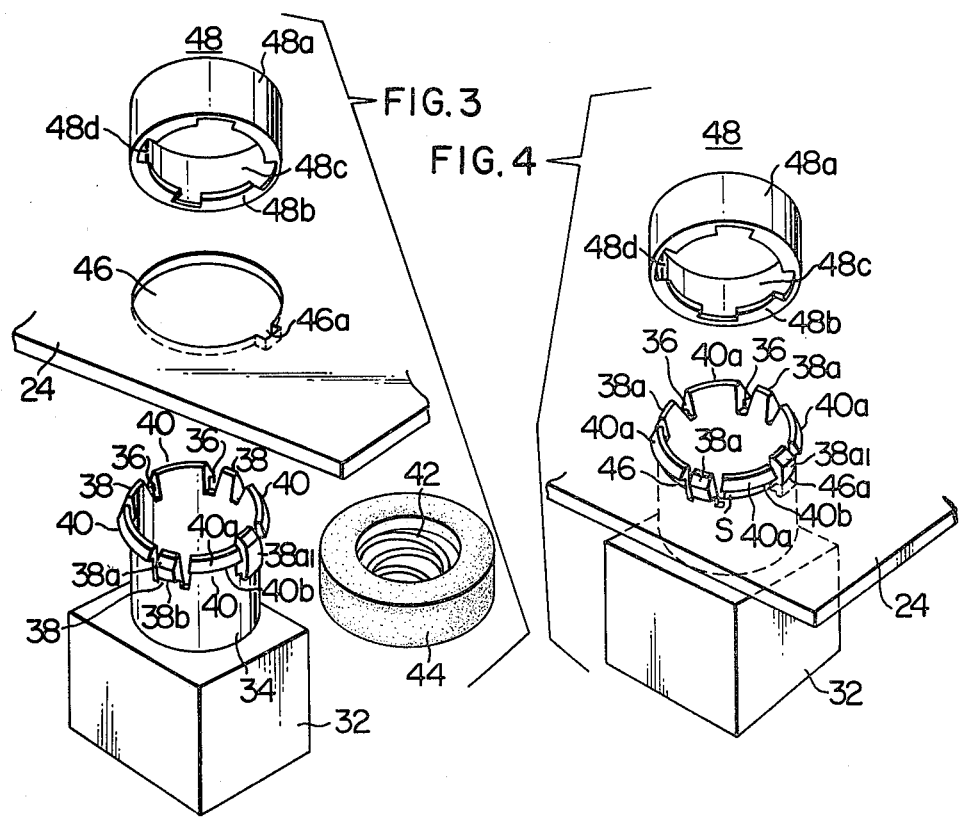

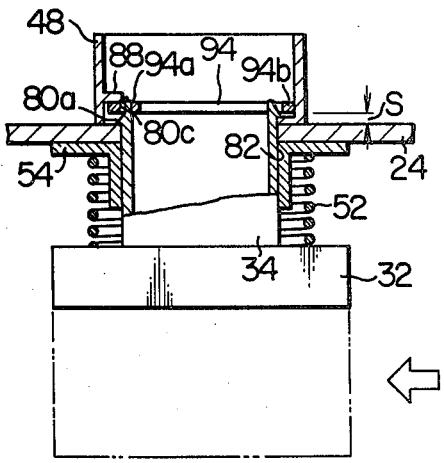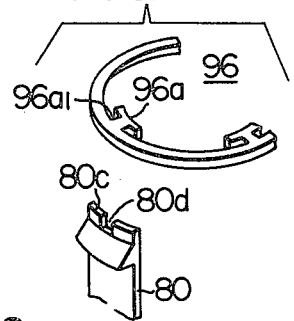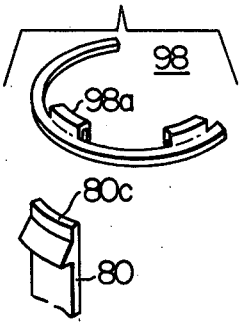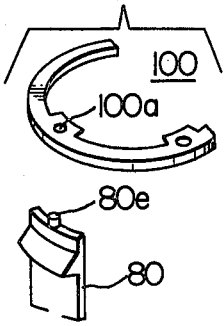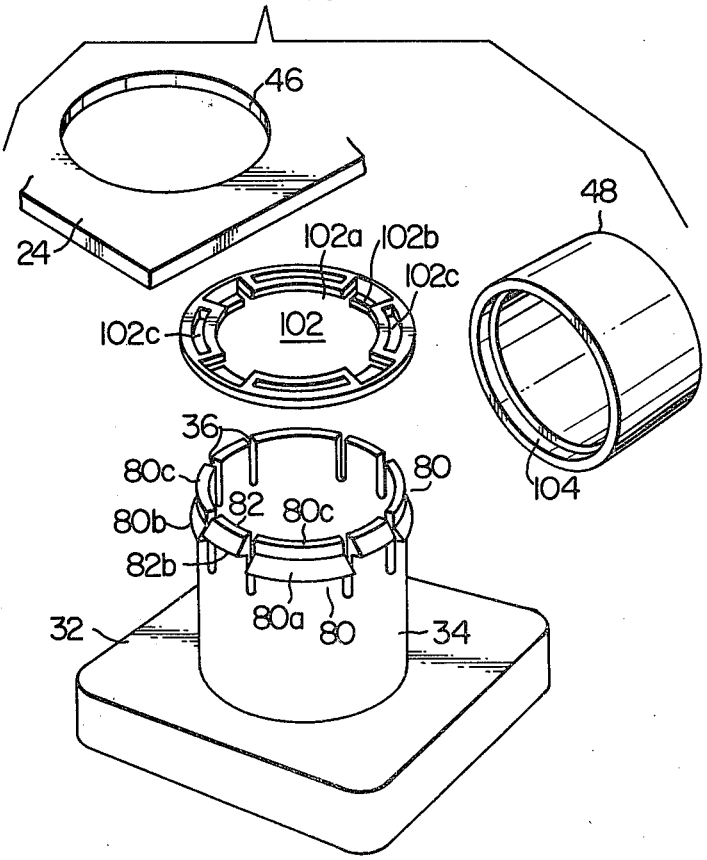

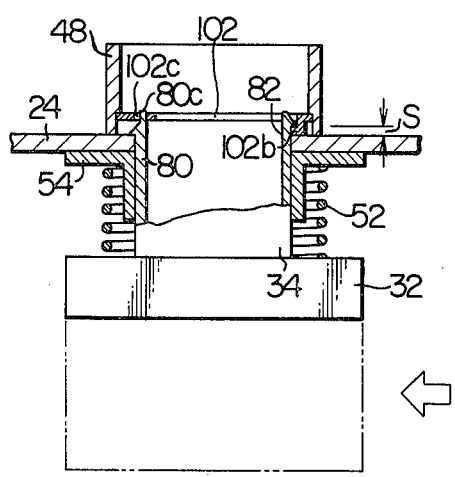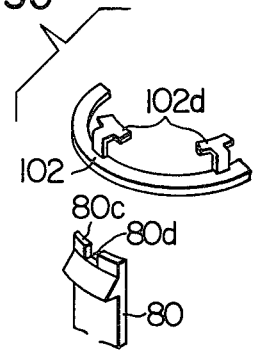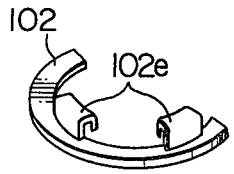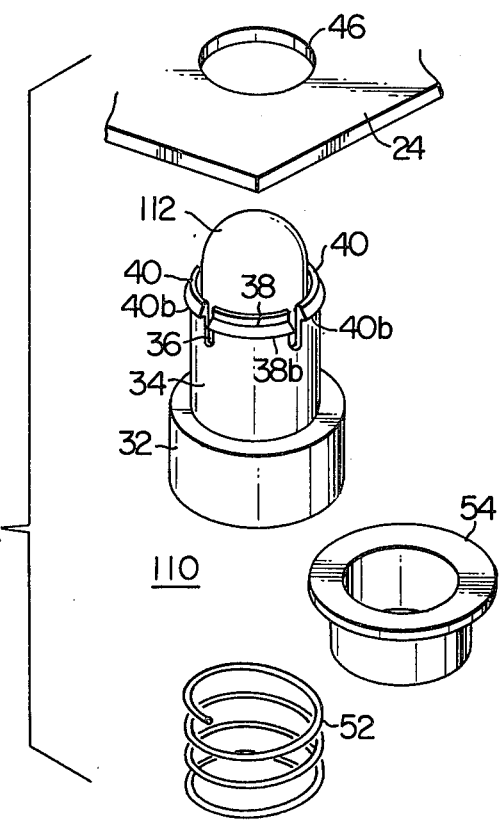

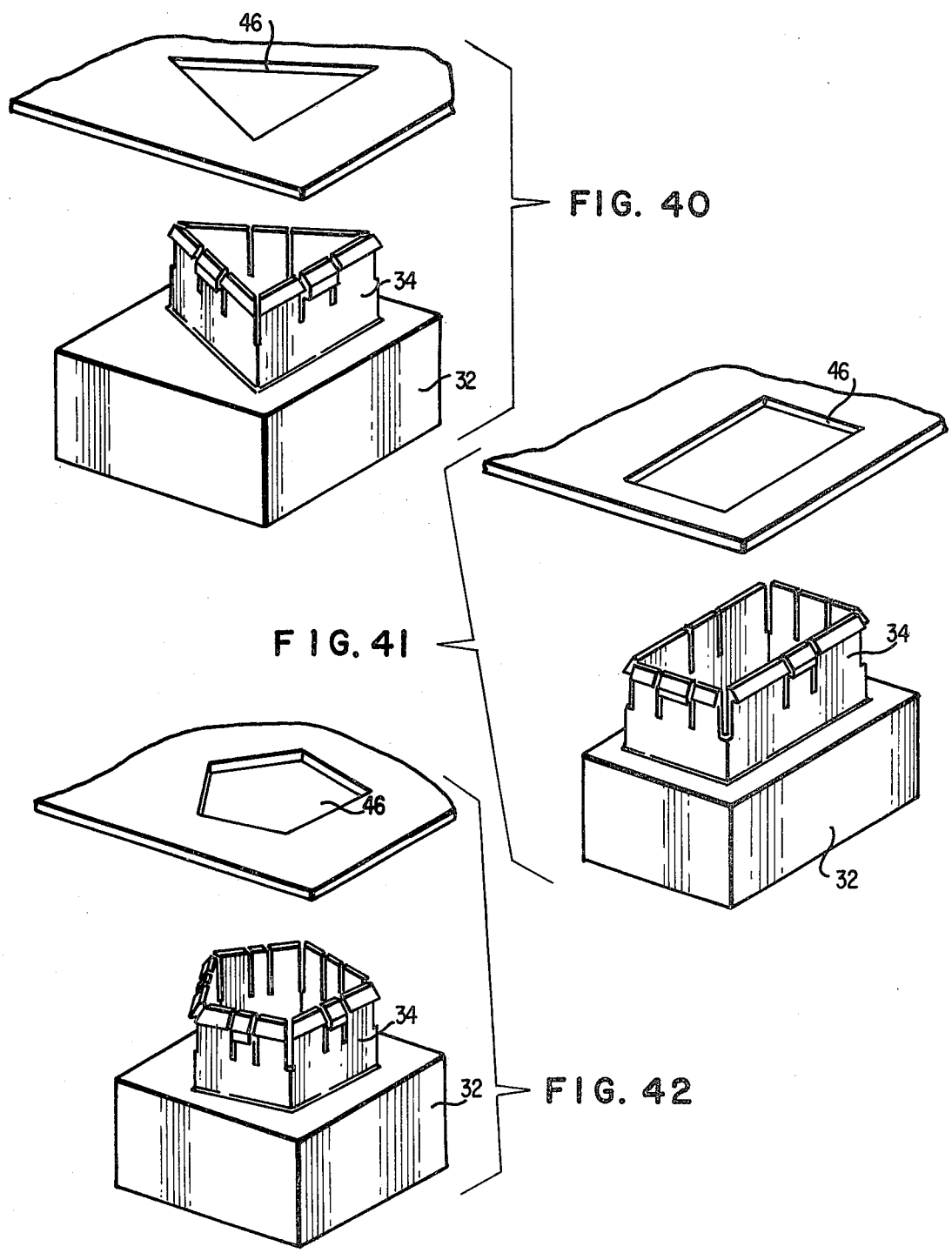

MOUNTING DEVICE FOR COMPACT APPARATUS

BACKGROUND OF THE INVENTION

This invention relates to a mounting device for a compact electrical apparatus, or more in particular to a mounting device for a compact electrical apparatus, by which the apparatus may be stably mounted on a panel merely by inserting a part of the main body of a casing of the apparatus in a mounting hole formed in the panel.

In the conventional methods for mounting a compact electrical apparatus such as a push button switch or an indication lamp on a support member such as a panel, a cylindrical portion formed as a part of the main body of a casing of the apparatus is inserted from the back side of the panel into a mounting hole of the panel and a part of the cylindrical portion is projected to the front side of the panel. The apparatus is then fixed to the panel by screwing an internally-threaded mounting ring on a threaded outer peripheral portion of the cylindrical portion. In the case where the panel has a small area, one assembler is enough to perform the mounting work. When a large panel area is involved, however, the assembler is unable to reach the other side of the panel, with the result that two assemblers are required, one holding the apparatus on the back side of the panel, the other screwing the mounting ring on the front side of the panel, thus calling for additional labor.

OBJECTS AND SUMMARY OF THE INVENTION

An object of the present invention is to eliminate the above-mentioned disadvantages and to provide an apparatus-mounting device so configured as to enable a single assembler to perform the mounting work with rapidity.

Another object of the invention is to provide a mounting device for a compact electrical apparatus, in which a cylindrical pillar portion having mounting means made of a flexible resin member and adapted to be mounted on a panel by being inserted in a mounting hole of the panel is integrally formed with the main body of a casing of the apparatus.

In order to achieve the above-mentioned objects, according to one aspect of the present invention, there is provided a mounting device for an electrical apparatus enclosed in a casing of an insulating material, the device comprising: the casing including a main body portion with a cavity for containing the component elements of the electrical apparatus and a hollow pillar-shaped portion extending from one external side of the main body portion, the hollow portion of the hollow pillar-shaped portion being formed along a longitudinal axis of the pillar-shaped portion and communicating with the cavity of the main body, the hollow pillar-shaped portion having its free end divided into a plurality of segments by a plurality of slots extending along the axis from the free end, a first set of segments in a predetermined number being selected among said plurality of segments, each of the first set of segments having its free end integrally formed with a portion protruded outward thereby to form a step on the opposite end of the protruded portion to the free end, the protruded portion of each of the first set of segments being arranged such that when the free end of the hollow pillar-shaped portion is registered with and pressed against a mounting hole formed in a supporting panel means, in use, in order to fix the casing onto the panel means the protruded portion is pressed inwardly by the periphery of the mounting hole, thereby causing the segment associated with the protruded portion to bend inward elastically and such that the segment associated with the protruded portion is restored to the original position thereof after the protruded portion has passed through the mounting hole; and the device further comprising bias means for exerting a force to keep away the one external side of the main body and the supporting panel means from each other after the protruded portion of each of the first set of segments has passed through the mounting hole, in use, thereby pressing the supporting panel means into contact with the step of each of the first set of segments.

BRIEF DESCRIPTION OF THE DRAWINGS

The other objects and features of the present invention will become apparent when reading the following detailed description with reference to the accompanying drawings, in which:

FIG. 1 is an elevational sectional view of a conventional mounting device;

FIG. 2 is a perspective view of a compact electrical apparatus mounting on a panel by a mounting device according to an embodiment of the present invention;

FIG. 3 is a perspective view showing the collocation of the component elements of the mounting device of the embodiment of FIG. 2 before the apparatus is mounted thereby;

FIG. 4 is a perspective view showing the main body or casing of the apparatus of FIG. 3 mounted on the panel;

FIG. 24 is an elevational sectional view showing the mounting device of FIG. 23 after being mounted on the panel;

FIG. 25 is a perspective view showing the modified parts of a modification of the embodiment shown in FIG. 23;

FIG. 26 is a perspective view showing the modified parts of another modification of the embodiment shown in FIG. 23;

FIG. 27 is a perspective view showing the modified parts of still another modification of the embodiment shown in FIG. 23;

FIG. 28 is a perspective view showing a still further embodiment of the mounting device according to the present invention before being mounted on the panel;

FIG. 29 is an elevational sectional view of the mounting device shown in FIG. 28 after being mounted on the panel;

FIG. 30 is a perspective view showing the modified parts of a modification of the embodiment shown in FIG. 28;

FIG. 31 is a perspective view showing the modified parts of another modification of the embodiment shown in FIG. 28;

FIG. 32 is an embodiment of the present invention as applied to an indication lamp before being mounted on the panel;

FIGS. 40-42 each shows a perspective view of a main body or casing formed in accordance with an alternative embodiment of the present invention.

DETAILED DESCRIPTION OF THE PREFERRED EMBODIMENTS OF THE INVENTION

Figure 5:
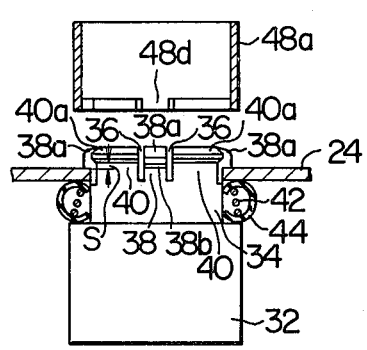
FIG. 5 is an elevational sectional view of the embodiment with the components thereof in the relative positions as shown in FIG. 4.

To facilitate better understanding of the present invention, a conventional mounting device will be described with reference to FIG. 1 prior to detailed explanation of the present invention. An elevational sectional view of a compact electrical apparatus such as a push-button switch mounted on a panel is shown in FIG. 1. In this drawing, reference numeral 20 shows the main body of a casing containing the switch section of the push button switch, numeral 21 a push button, numeral 22 a cylindrical pillar portion extending from the main body 20 and having the outer periphery thereof threaded. The cylindrical pillar portion 22 is inserted through the mounting hole of the panel 24 from the back side thereof. On the front side of the panel 24, an internally threaded mounting ring 28 is screwed to the cylindrical pillar portion 22 projected to the front side of the panel 24, thereby fastening the main body 20 of the push button switch to the panel 24. Numeral 30 shows a plurality of rubber packings functioning as spacers and stoppers. The number of the packings 30 is determined appropriately depending on the thickness of the panel 24. The shortcomings of this type of the conventional mounting device are already described above.

A preferred embodiment of the present invention applied to the conventional mounting device for the push button switch shown in FIG. 1 will be described below with reference to FIGS. 2 to 6. To avoid complication, the switch section and the pushbutton section for operating the switch section are not shown in FIGS. 3 to 6. An apparatus casing body 32 made of an insulating material such as a resin is formed with a mounting cylindrical pillar portion 34. At the upper or free end of the opening of the cylindrical portion 34, a plurality of two types of mounting segments 38, 40 different in width and isolated by a plurality of slots 36 are alternately positioned. At the upper ends of the mounting segments 38, 40, protrusions 38a, 40a extending radially outward are formed respectively, thereby forming engaging steps 38b, 40b respectively. The protrusions 38a of the narrow mounting segments 38 are expanded outward and downward more than the protrusions 40a of the wide mounting segments 40, so that the steps 38b are located slightly lower than the steps 40b.

Numeral 42 shows a spring member covered with a water-proof annular rubber member 44 with a substantially channel-shaped radial cross section.

In mounting the apparatus on the panel 24, the spring member 42 covered with the water-proof rubber 44 is first fitted on the cylindrical pillar portion 34 and held between the upper surface of the apparatus casing body 32 and the steps 38b. Numeral 46 shows a mounting hole formed in the panel 24, which is preferably formed with a stopper notch 46a. From the back side of the panel 24, the cylindrical pillar portion 34 is inserted into the mounting hole 46 with the forward end thereof first. In the process, provision of the protrusions 38a, 40a at the upper or free end of the opening of the cylindrical pillar portion 34 prevents easy insertion thereof. By forcible insertion, the fact that the plurality of slots 36 are formed at the upper or free end of the cylindrical pillar portion 34 and as a result the mounting segments 38, 40 are elastic causes the mounting segments 38, 40 to bend inwardly. The opening of pillar portion 34 is thus inwardly narrowed while the cylindrical pillar portion 34 is being inserted into the mounting hole 46. At the same time, the spring 42 is compressed. After the protrusions 38a, 40a of the opening of the cylindrical pillar portion 34 have passed through the mounting hole 46, the force thus far applied to the protrusions 38a, 40a of the mounting segments is eliminated, so that the narrowed opening end of pillar portion 34 is restored to the original condition thereof. The panel 24 is held in pressed contact between the respective deeper steps 38b of the cylindrical pillar portion 34 and the upper surface of the rubber ring 44 by the spring 42. Preferably, one of the protrusions 38a of the mounting segments 38, such as the one denoted as $38a_1$, is extended further downward as shown in the drawing. Thus, by fitting the extended protrusion $38a_1$ in the notch 46a of the mounting hole 46, it acts as a stopper for the apparatus after the apparatus has been mounted on the panel. Such a condition is illustrated more clearly in FIG. 4, wherein the rubber ring 44 is not shown for the sake of simplification. Each of FIGS. 4 and 5 shows the status where the cylindrical pillar portion 34 of the main body 32 has been completely mounted on the panel 34. Since the steps 40b of the mounting segments 40 are shallower in height than the steps 38b of the mounting segments 38, the steps 38b are engaged closely in abutment with the upper surface of the panel 24, while a predetermined gap S occurs between the steps 40b and the upper or front surface of the panel 24. As explained later, this enables a vessel or ring 48 or like to be mounted on the top end of the cylindrical pillar portion 34 to guide or guard the operating section, such as a push bottom, of the apparatus. In the case where the vessel or ring 48 or like is not required to be mounted on the apparatus, the lower surfaces of the protrusions 38a, 40a, i.e., the depth of the steps 38b, 40b may of course be rendered uniform.

In this way, the apparatus casing body 32 may be readily and easily mounted by an assembler without the aid of any helping hand by merely pressing the upper or free end of the opening of the cylindrical pillar portion 34 against the mounting hole 46 from the back side of the panel 24.

Figure 6:
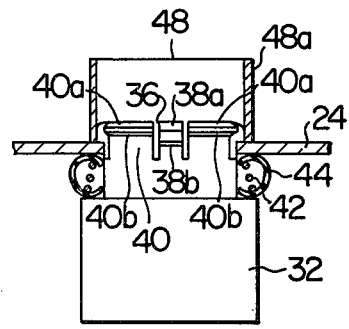
FIG. 6 is an elevational sectional view of the apparatus completely mounted as shown in FIG. 2.

An example of the vessel or ring 48 is shown in FIGS. 2 to 6. The vessel or ring 48 includes a cylindrical side portion 48a and a flange portion 48b at the lower end thereof which extends in a radially inwardly direction. The flange portion 48b defines an aperture 48c for receiving the upper or free end of the cylindrical pillar portion 34. Also, the flange portion 48b is formed with a plurality of notches 48d for loosely receiving the protrusions 38a which form the deeper steps 38b. The vessel or ring 48 may be mounted by an assembler from the front side of the panel 24 without the aid of any helping hand. As shown in FIGS. 4 and 5, when the vessel or ring 48 is fitted on the upper or free end of the opening of the cylindrical pillar portion 34 of the main body which has been mounted on the panel 24, from the front side of the panel 24, the protrusions 38a of the mounting segments 38 are readily loosely fitted through the notches 48d. The mounting segments 40, on the other hand, are prevented from being inserted by the protrusions 40a. Forcible insertion causes the free ends of the mounting segments 40 to bend radially inwardly due to the elasticity thereof produced due to the presence of the slots 36, with the result that the protrusions 40a of the mounting segments 40 inserted into the vessel or ring 48 through the bottom aperture 48c of thereof ride over the respective flange portions 48b. The flange 48b is held in the space S between the steps 40b and the upper or front surface of the panel 24, thus securing the vessel or ring 48 in the manner as shown in FIG. 6. A perspective view of the same condition is shown in FIG. 2.

As will be noted from the foregoing explanation, the present invention is such that the outward protrusions 38a, 40a are formed at the upper or free ends of the respective mounting segments 38, 40 formed by the slots 36 at the upper or free end of the opening of the cylindrical portion of the main body 32. The cylindrical pillar portion 34 may be inserted from one side of the mounting hole 46 of the panel 24 while being inwardly narrowed by the elasticity of the mounting segments 38, 40, which is caused by the slots 36. After the insertion of the respective protrusions of the cylindrical pillar portion 34, the panel 24 is interposed under pressure between the steps 38b, 40b formed at the lower part of the protrusions and the rubber ring 44 with the supporting spring 42 fitted on the cylindrical pillar portion 34 in advance. In this way, the body 32 is mounted on the panel very easily by mere insertion thereof without any mounting aids or like members. Further, according to the invention, in view of the fact that the panel 24 is held under pressure between the steps formed on the protrusions of the mounting segments and the rubber ring 44 with the supporting spring 42 on the body 32, variations in the thickness of the panel 24 are absorbed by the supporting spring 42, thereby eliminating the need of limiting the panel thickness within a predetermined range.

Another feature of the present invention is that the mounting segments 38, which alternate with the mounting segments 40, have the protrusions 38a expanded both radially outward and downward to a larger extent than the protrusions 40a of the mounting segments 40, so that the steps 38b are located lower or deeper than the steps 40b. Also, the bottom aperture 48c of the vessel or ring 48 to be mounted from the front side of the panel 24 is provided with notches 48 to loosely receive the protrusions 38a. After mounting the body 32 on the panel 24, the flange 48b of the vessel or ring 48 is held in sandwiched relation in the space S between the panel 24 and the steps 40b. As a result, the mounting of the vessel or ring 48 does not require any aid or like member, but is accomplished by merely fitting it on the body 32 from the front side of the panel 24. The vessel or ring 48 may be replaced by any other analogous member such as a guard or plate. Also, the width and/or number of the mounting segments 38, 40 are not limited to those shown in the drawing.

Although the hollow pillar-shaped portion 34 of the device shown in the drawing takes the form of a cylindrical pillar, it may alternatively be such a pillar that has a cross section of a triangle, a rectangle or other polygon, with equal effect as shown in FIGS. 40–42, respectively. This is also the case with the mounting hole 46 of the panel 24, which may be triangular, rectangular, or polygonal instead of round also as shown in FIGS. 40–42, respectively. Further, the round vessel 48 may be replaced by a triangular, rectangular, or polygonal vessel with equal effect. This concept may be applied to all the embodiments described hereunder.

In explaining the device in FIGS. 1 to 6, reference was made to a push-button switch with the push button 21. The main body 32 including the pillar-shaped portion 34, however, may incorporate any desired switch-operating form such as a toggle switch operable from the panel front surface, instead of the push button switch. Furthermore, the application of the present invention is not limited to the switches but may encompass an indication lamp with a lamp built in.

Figure 7:
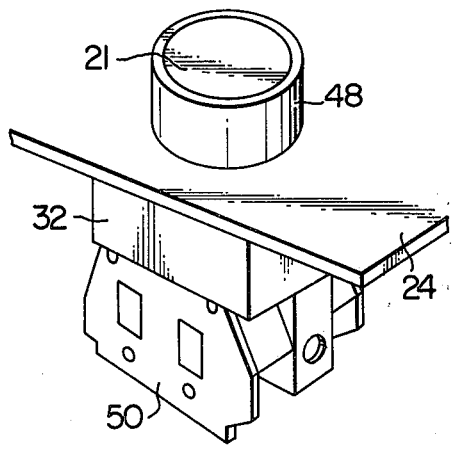
FIG. 7 is a perspective view showing a contact block additionally provided on the embodiment of FIG. 2.

In addition, the body 32 may include an operating mechanism (not shown) alone and as shown in FIG. 7, a contact block 50 may be separately mounted on the main body 32 so that contacts contained in the contact block 50 may be actuated from the front side of the panel 24 through the operating mechanism (not shown) within the body 32. Although not shown in the drawings, the device according to the present invention may also of course be configured in such a manner that a transformer is coupled directly to the underside of the contact block 50 and a transparent push button is contained within the pillar-shaped portion 34 to make up a light-emitting push button switch. In other words, the present invention has the feature that the cylindrical pillar portion 34 of the main casing body of a compact electrical apparatus such as a switch or a pilot lamp may be easily and readily mounted on the panel 24 from the back surface thereof by mere insertion. Another advantage of the invention is a simple construction thereof whereby a vessel or like is preferably mounted from the front surface of the panel 24 by simple operation of insertion.

Figure 8:
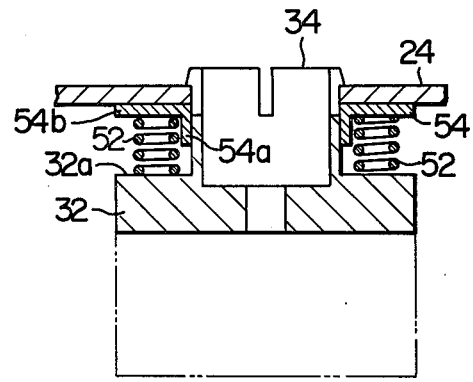
FIG. 8 is an elevational sectional view of another embodiment of the present invention.

Another embodiment is shown in FIG. 8. In this case, instead of using the rubber ring 44 with a spring 42, a flanged contact member 54 inserted onto the pillar 34 is pressed in contact with the back side of the panel 24 by means of a plurality of supporting springs 52 interposed between the back surface of the panel 24 and the step portion 32a of the main body 32. The contact member 54 has a cylindrical portion 54a and a flange portion 54b.

Figure 9:
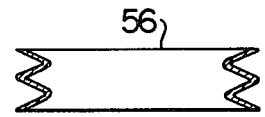
FIG. 9 is an elevational sectional view of an embodiment of a spacing member constituting a part of the mounting device according to the present invention.

Still another embodiment is shown in FIG. 9. The supporting spring 52 for pressing the panel 24 from the back side thereof is replaced by an annular pressing member 56 formed of a mold of an elastic resin material vertically flexible, as shown in the drawing. The pressing member 56 is fitted on the cylindrical pillar portion 34 thereby to press the back side of the panel 24.

Figure 10:
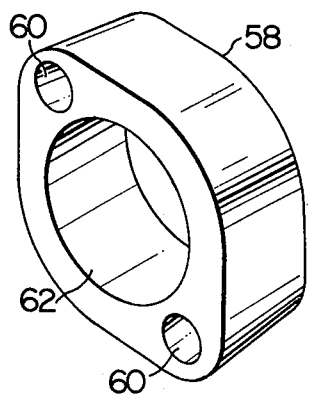
FIG. 10 is an elevational sectional view showing another embodiment of the spacing member constituting a part of the mounting device according to the present invention.

FIG. 10 shows a further embodiment, in which in place of the contact member 54 shown in FIG. 8, an annular member 58 of plastics or rubber having a plurality of axially extending holes 60 is employed. The holes 60 are preferably open at one end thereof. A spring (not shown) is inserted into each of the holes 60, and the resulting assembly is used in a manner similar to the rubber ring 44, with the cylindrical pillar portion 34 fitted in the center through hole 62. It will be easily understood that the advantages of the embodiment under consideration are the same as those achieved by the embodiments mentioned above.

Figure 11:
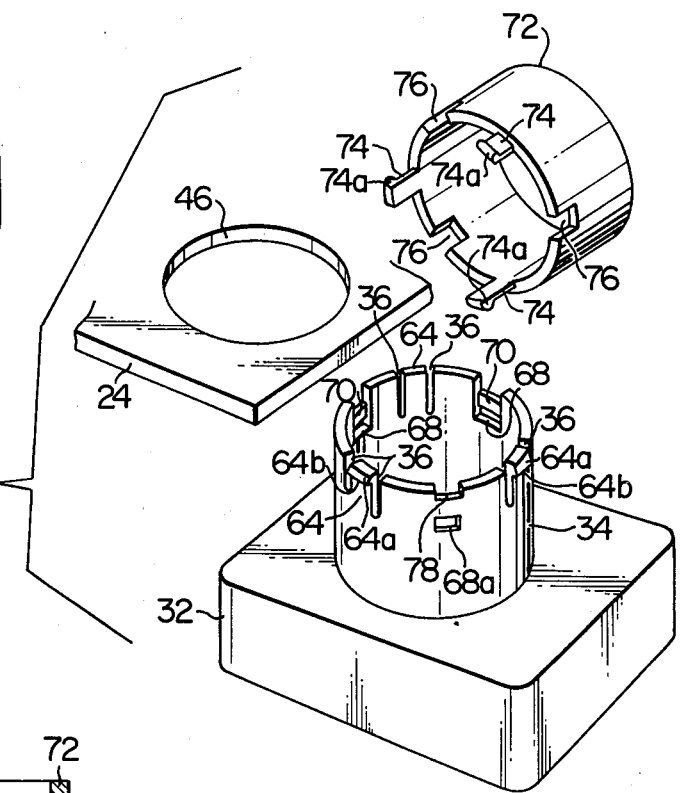
FIG. 11 is a perspective view showing another embodiment of the mounting device according to the present invention before being mounted on the panel.
Figure 12:
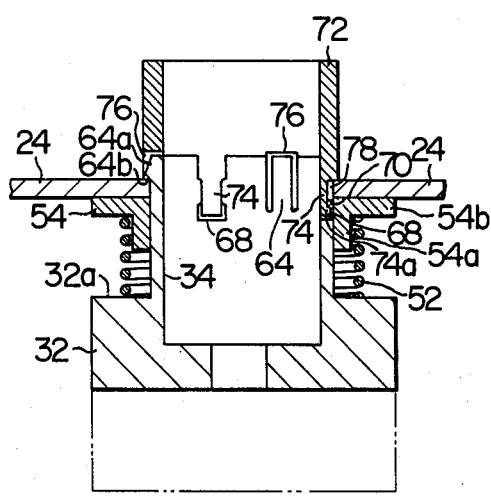
FIG. 12 is an elevational sectional view of the embodiment shown in FIG. 11 after being mounted on the panel.

A still further embodiment will be described below with reference to FIGS. 11 and 12. In the drawings, the component elements similar to those included in FIGS. 2 to 8 are denoted by like reference numerals and have like functions. In the embodiment under consideration, the cylindrical pillar portion 34 is formed with a plurality of slots 36 to thereby form a plurality of flexible mounting segments 64 each of which is given elasticity due to the slots 36 on both sides thereof and formed with radially outwardly projected protrusion 64a and step 64b formed at the lower end of the protrusion 64a. The cylindrical pillar portion 34 is further formed with recess portions 68 at a pregiven level or depth from the opening end of the cylindrical pillar portion on the inside thereof intermediate adjacent mounting segments 64, and other recess portions 70 shallower than the recess portion 68, for connecting the recess portion 68 and the opening end of the pillar 34. The recess portion 68 may alternatively take the form of through holes such as shown by 68a. In mounting the body 32 thus configured on the panel 24, the opening end of the cylindrical pillar portion 34 of the body 32 is pressed against the mounting hole 46 of the panel 24 while compressing the spring 52 through the contact member 54 as shown in FIG. 12.

Of course, the spring member 42 with the cover 44, the spring member 56, or the spring means with the ring 58 may be employed instead of the combination of the spring 52 and the flanged ring 54. The mounting segments 64 have the protrusions 64a and therefore the cylindrical portion 34 cannot be freely fitted in the mounting hole 46, but the slight pushing of the cylindrical pillar portion 34 causes the mounting segments 64 to bend inwardly and enables each of the protrusions 64a to pass through the hole 46 due to the elasticity of each segment 64 provided by the slots 36 on both sides thereof. After passage through the hole 46, the segments 64 restore their original state. The result is that, as shown in FIG. 12, the panel 24 is held between the steps 64b of the mounting segments 64 and the flange portion 54 of the contact member 54 securely by the spring 52. The above-mentioned means for securing the body 32 to the panel 24 is the same as that included in the embodiments described with reference to FIGS. 2 to 8. The embodiment under consideration, however, is different from the preceding embodiments in the method for mounting the vessel or ring cap 72. The vessel or ring cap member 72 has elastic legs 74 protruded from the bottom thereof at the positions corresponding to the shallow recesses 70 of the cylindrical pillar portion 34. The end of each of the legs 74 has a radially outwardly projected protrusion 74a. Also, the member 72 has notches 76 at the positions corresponding to the protrusions 64a of the mounting segments 64 of the cylindrical pillar portion 34. With the body 32 mounted on the mounting panel 24, the elastic legs 74 are inserted into the opening of the cylindrical pillar portion 34 by being guided through the corresponding shallow recesses 70 of the cylindrical pillar portion 34 so that the protrusions 74a at the ends of the elastic legs 74 are fitted in engagement with the corresponding recess portion 68 or the through holes 68a communicated with the shallow recesses 74, thereby securing the vessel or ring cap member 72 to the cylindrical pillar portion 34. A longitudinal sectional view of the assembly of the mounting device with the vessel or ring cap 72 mounted thereon is shown in FIG. 12. As seen from this drawing, the protrusions 64a formed on the mounting segments 64 of the cylindrical pillar portion 34 are received by the notches 76 of the vessel or ring cap 72. Preferably, notches 78 are formed above the recess portions 68 or through holes 68a and the shallow recesses 70 as shown in FIG. 11. The notches 78 are for rightly leading the legs 74 into the shallow recesses 70 in mounting the vessel or ring cap 72. It will be easily understood that the embodiment under consideration has the same advantages as those described with reference to FIGS. 2 to 10.

Figure 13:
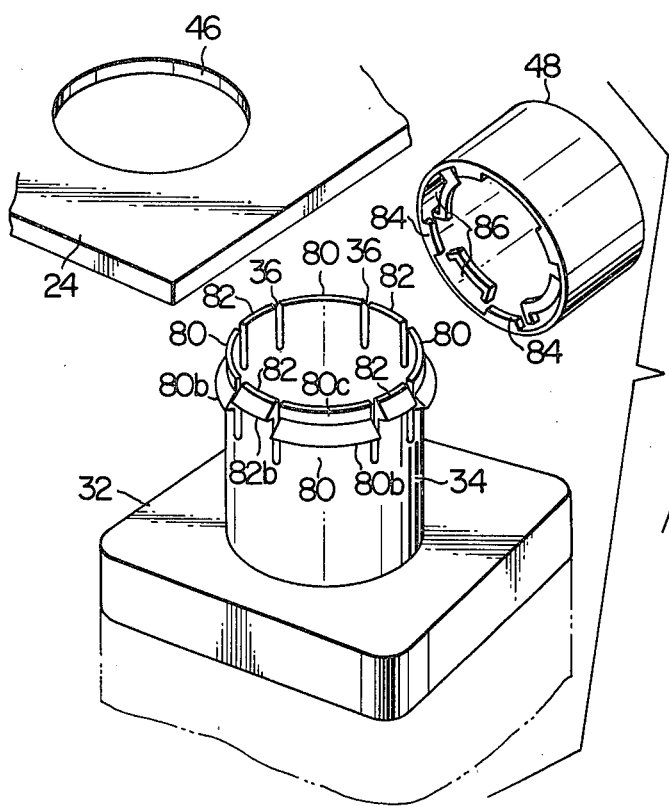
FIG. 13 is a perspective view showing still another embodiment of the mounting device according to the present invention before being mounted on the panel.
Figure 15:
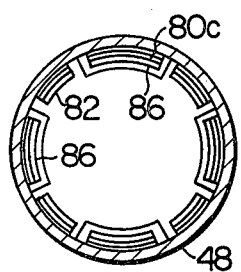
FIG. 15 is a cross sectional view taken in line A—A in FIG. 14.
Figure 14:
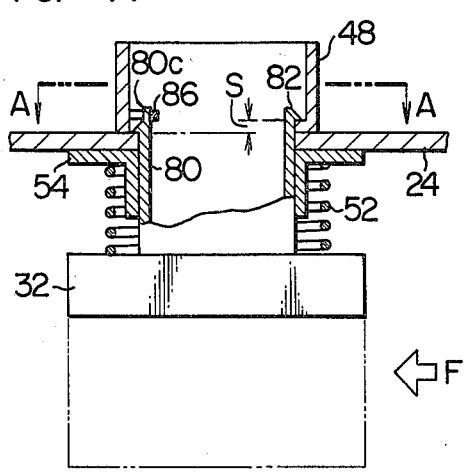
FIG. 14 is an elevational sectional view showing the mounting device of FIG. 13 after being mounted on the panel.

A still further embodiment is shown in FIGS. 13 to 15, in which the component elements or members having the same functions as those in the preceding embodiments are denoted by like reference numerals. In the embodiment under consideration, the elastic mounting segments at the open end of the cylindrical pillar portion 34 are formed in a manner similar to those of the embodiments explained with reference to FIGS. 3 to 8. In other words, the open end of the cylindrical pillar portion 34 is formed with a first set of a plurality of mounting segments 80 and a second set of a plurality of mounting segments 82 separated by a plurality of slots 21. The first set of mounting segments 80 and the second set of mounting segments 82 have upper or free ends thereof expanded outward to form steps 80b and 82b respectively. The steps 82b of the second set of mounting segments 82 are located higher than the steps 80b of the first set of mounting segments 80, thereby providing a space S therebetween as shown in FIG. 14. The casing body 32 of the apparatus with this construction is mounted on the panel 24 by inserting the cylindrical pillar portion 34 into the mounting hole 46 of the panel 24 from the back side thereof, in quite the same manner as described with reference to the embodiments shown in FIGS. 3 to 8.

Assume that an external force F is applied to the apparatus casing body 32 as shown by arrow in this configuration with the apparatus casing body 32 mounted on the panel 24. The first set of elastic mounting segments 80 may be bent inward and therefore the steps 80b are likely to be disengaged from the periphery of the mounting hole 48. This disadvantage might be overcome by improving the rigidity of the first set of elastic mounting segments 80 and the second set of mounting segments 82 or increasing the drag of the spring 52. Nevertheless, such a suggested solution finds difficulty in insertion of the cylindrical pillar portion 34 into the mounting hole 40, thus making practical application of the invention inconvenient.

The embodiment under consideration is improved in that point, and uses a ring member or vessel 48 such as a decoration ring or guard member mounted at the top or free end of the cylindrical pillar portion 34 from the front side of the panel 24. The ring member 48 is formed with means for engaging the upper ends of the first set of elastic mounting segments 80 whereby the first set of elastic mounting segments 80 are fixed. Under the condition where the apparatus casing body 32 is mounted on the panel 24, the space S is formed between the steps 80b of the first set of elastic mounting segments 80 and the steps 80b of the second set of elastic mounting segments 82, so that space S is also formed between the front surface of the panel 24 and the steps 82b of the second set of elastic mounting segments 82. The vessel or ring member 48 is provided with engaging portions 84 at the peripheral portions of its lower end corresponding to the second set of elastic mounting segments 82. These engaging portions 84 are fitted to engage the steps 82b in the space S between the steps 82b of the second set of elastic mounting segments 82 and the front surface of the panel 24, thus enabling the vessel or ring member 48 to be mounted on the upper or free end of the cylindrical pillar portion 34. To this extent, the embodiment under consideration is quite identical to those described with reference to FIGS. 3 to 8. The embodiment under consideration, however, is different from the preceding embodiments in that in the embodiment under consideration, the internal periphery of the lower end of the vessel or ring member 48 is formed with further engaging portions 86 adapted to be fitted on and engage the upper ends of the first set of elastic mounting segments 80. Simultaneously with the fitting of the vessel or ring member 48 by the engagement between the engaging portions 84 and the steps 82b of the second set of elastic mounting segments 82, the upper ends of the first set of elastic mounting segments 80 are fitted into the corresponding openings formed in the engaging portions 86, thus fixedly securing the first set of elastic mounting segments 80. The first set of elastic mounting segments 80 are in this way prevented from being tilted radially inward even when the external force F is applied to the apparatus casing body 32.

Figure 16:
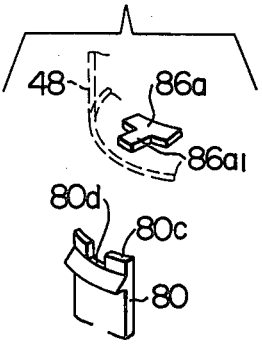
FIG. 16 is a perspective view showing the modified parts of a modification of the embodiment of FIG. 13.

A perspective view of a modification of the embodiments described with reference to FIGS. 13 to 15 is shown in FIG. 16. The vessel or ring member 48 is formed with substantially flat and T-shaped engaging portions 86a instead of the engaging portions 86, while on the other hand slots 80d are formed at the upper end 80c of the first set of elastic mounting segments 80, so that legs 86a₁ of the T-shaped engaging portions 86 are fitted in the corresponding slots 80d.

Figure 17:
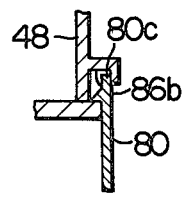
FIG. 17 is an elevational sectional view showing the modified parts of another modification of the embodiment of FIG. 13.

The diagram of FIG. 17 shows an elevational sectional view of the essential parts of still another modification of the embodiment shown in FIGS. 13 to 15. The lower end of the vessel or ring member 48 is formed with engaging portions 86b with a section in the shape of a channel open on the lower side, instead of the engaging portions 86. The channel-shaped engaging portions 86b are adapted to be fitted on the upper ends 80c of the first set of elastic mounting segments 80 as shown in FIG. 17.

Figure 18:
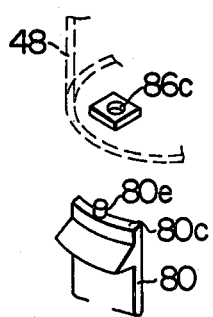
FIG. 18 is a perspective view showing the modified parts of still another modification of the embodiment of FIG. 13.

A perspective view of the essential parts of further still another modification of the embodiment mentioned with reference to FIGS. 13 to 15 is shown in FIG. 18. The upper ends 80c of the first set of elastic mounting segments 80 are provided with protrusions 80e, while engaging recesses or openings 86c adapted to engage the corresponding protrusions 80e are formed in the vessel or ring member 48.

Figure 19:
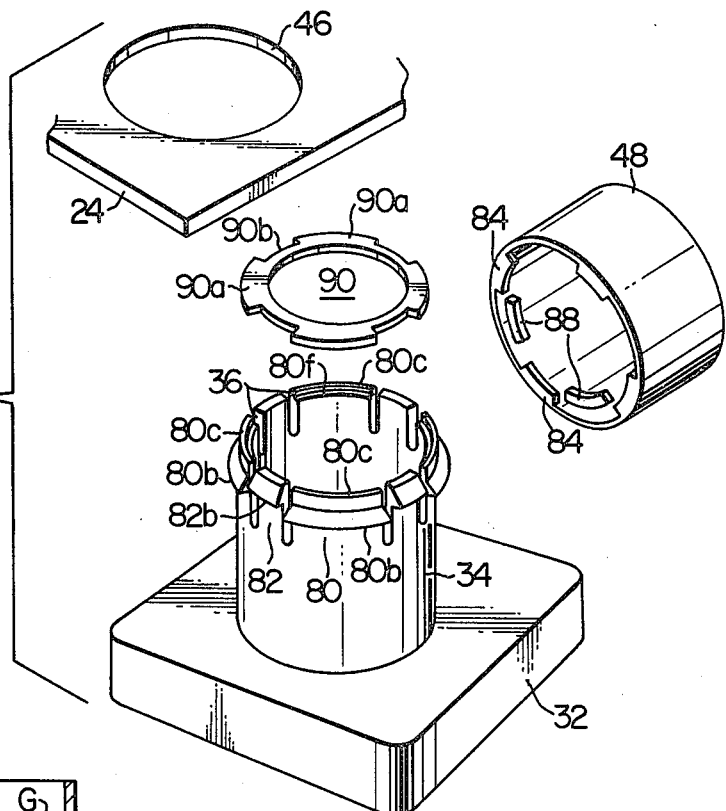
FIG. 19 is a perspective view showing a further embodiment of the mounting device according to the present invention before being mounted on the panel.
Figure 20:
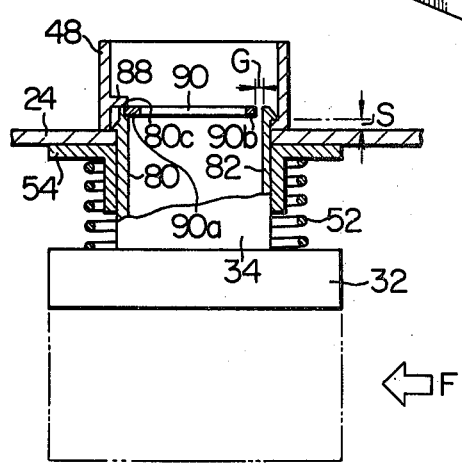
FIG. 20 is an elevational sectional view showing the mounting device of FIG. 19 after being mounted on the panel.
Figure 21:
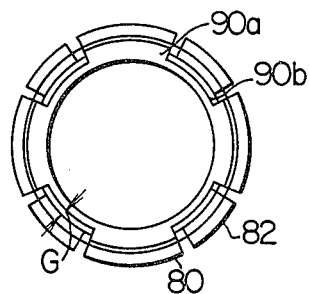
FIG. 21 is a plan view of the mounting device of FIG. 20.

In the embodiment shown in FIGS. 19 to 21, the second set of elastic mounting segments 82 formed on the cylindrical pillar portion 34 have exactly the same shape as those of the embodiment shown in FIGS. 13 and 14, but the first set of elastic mounting segments 80 have such a different shape that the inside of the upper end 80c is cut for a reduced thickness, thereby forming steps 80f. The functions of the steps 80f will be described later. The processes of mounting the cylindrical pillar portion 34 in the mounting hole 46 of the panel 24 is quite the same as those described with reference to FIGS. 3 to 8. According to the embodiment under consideration, a fixing member 90 is provided in order to prevent the first set of elastic mounting segments 80 from coming off the mounting hole 46 of the panel 24 when the force F is applied after the body 32 has been mounted on the panel 24. The fixing member 90 is formed into annular form by sheet metal working, and the parts of the outer periphery thereof corresponding to the first set of elastic mounting segments 80 are formed with holding protrusions 90a. Those parts of the peripheral portion of the fixing member 90 which correspond to the second set of elastic mounting segments 82 between adjacent holding protrusions 90a, on the other hand, are formed with recesses 90b. The fixing member 90 is thus configured to be fitted in position within the open end of the cylindrical pillar portion 34. Under the condition where the fixing member 90 is fitted within the open end of the cylindrical pillar portion 34, the holding protrusions 90a are in contact with the inner surfaces of the first set of the elastic mounting segments 80 on the one hand and the space G is formed between the recesses 90b and the inner surfaces of the second set of elastic mounting segments 82 on the other hand. In this way, the first set of elastic mounting segments 80 are fixedly secured and prevented from being tilted inward, while at the same time permitting the second set of elastic mounting segments 82 to be freely tilted within the space G. The fixing member 90 is held in sandwiched relation between the protruded steps 88 formed on the inner wall of the vessel or annular decoration member 48 and the inner side steps 80f of the first set of elastic mounting segments 80.

Figure 22:
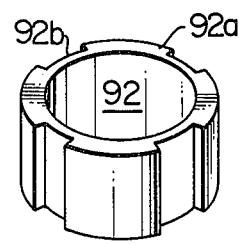
FIG. 22 is a perspective view showing a modification of the fixing member shown in FIG. 19.
Figure 23:
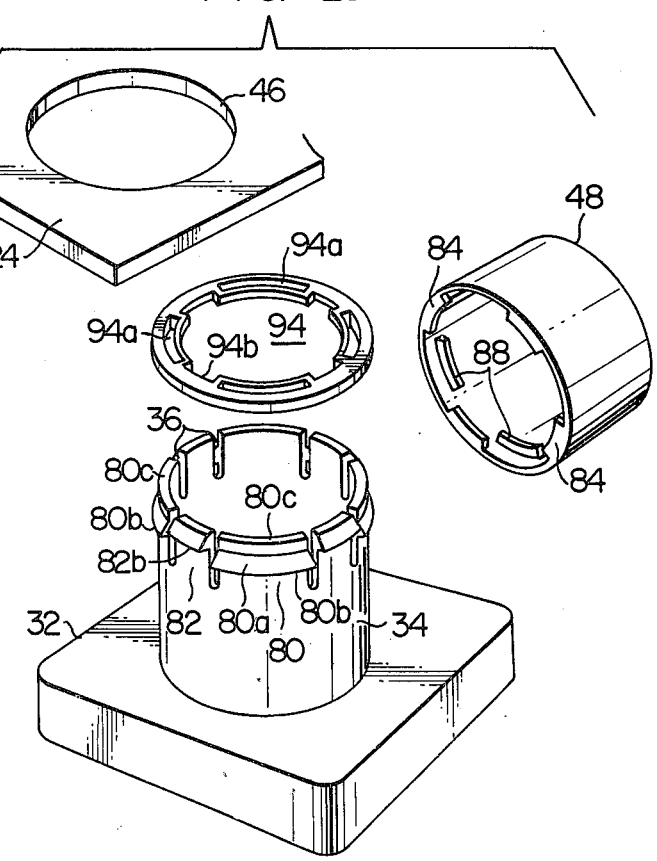
FIG. 23 is a perspective view showing still another embodiment of the mounting device according to the present invention before being mounted on the panel.

FIG. 22 shows a cylindrical fixing member 92 which is a modification of the fixing member 90. The cylindrical fixing member 92 is molded of a resin material into cylindrical form and provided with holding parts 92a on the outside thereof. The cylindrical fixing member 92 has the same cross section as the fixing member 90. Recesses 92b between adjacent holding parts 92a correspond to the recesses 90b of the fixing member 90. As easily understood, the cylindrical fixing member 92 has the same function as the fixing member 90. In this case, it is possible to integrally form means for alternating operation in connection with the operating section or like of a push button switch.

The means for mounting the fixing member 90 or 92 on the upper end of the cylindrical pillar portion 34 and the means for engaging the engaging portion 90a or 92a of the fixing member 90 or 92 to the first set of elastic mounting segments 80 may take the form of a modification other than the shown embodiment. Further, the means for mounting the vessel or decoration ring member 48 on the cylindrical pillar portion 34 may assume a modification of the engaging means shown in the embodiment.

The vessel or decoration ring member 48, when used with a push-button switch, may be provided with a function as a guard for the push button, or when used with an indication lamp, a function of illumination.

It will be easily noted that also in the embodiment shown in FIGS. 19 to 22, application of external force F after the main body 32 is mounted on the panel 24 does not cause the first set of the elastic mounting segments 80 to come off the mounting hole 40.

The essential parts of the embodiment shown in FIGS. 23 to 27 are similar to those of the embodiments explained with reference to FIGS. 13 to 22. In the embodiment shown in FIGS. 23 and 24, the cylindrical pillar portion 34 has the same shape as the embodiment of FIGS. 13 and 14, and therefore, the cylindrical pillar portion 34 is mounted in the mounting hole 46 of panel 24 in quite the same manner as the embodiment of FIGS. 13 and 14. Further, the vessel or decoration ring 48 has quite the same shape as that in the embodiment of FIG. 19, so that the ring member 48 is engaged with the end of the cylindrical pillar portion 34 in quite the same way as in the embodiment of FIG. 19. The fixing member 94 in the embodiment under consideration, however, is somewhat different from the fixing member 90 shown in the embodiment of FIG. 19. In other words, the fixing member 94 is formed within annular shape and is provided with engaging slots 94a at the parts thereof corresponding to the first set of elastic mounting segments 80. When the fixing member 94 is fitted on the external periphery of the end of the cylindrical pillar portion 34, the engaging slots 94a are fittingly engaged with the ends 80c of the first set of elastic mounting segments 80, thus preventing the first set of elastic mounting segments 80 from being inwardly tilted. The fixing member 94, with the vessel or decoration ring member 48 mounted on the cylindrical pillar portion 34, is adapted to be held between the expanded end portions 80a of the first set of elastic mounting segments 80 and the steps 88 provided at the inside surface of the vessel or decoration ring member 48. Under this condition, the expanded end portions 82b of the second set of elastic mounting segments 82 are received by the recesses 94b between adjacent engaging slots 94a, so that the ends of the second set of elastic mounting segments 82 are flexible enough to be freely tilted inward.

As readily understood, the embodiment under consideration is a modification of the embodiment of FIGS. 13 to 15 and operates and functions the same way as the latter.

Other embodiments of the fixing member 94 according to the present invention are shown in FIGS. 25 to 27. The inner peripheral portion of the fixing member shown in FIG. 25 has a plurality of substantially T-shaped engaging portions 96a instead of the slots 94a. The legs 96a₁ of the engaging portions 96a are fitted in the corresponding slots 80d formed at the upper ends 80c of the first set of elastic mounting segments 80, so that the ends of the engaging portions 96a are positioned on the inside of the first set of elastic mounting segments 80, as in the embodiment of FIG. 16. Referring to FIG. 26, the inner peripheral part of the fixing member 98 is formed with a plurality of bent engaging portions 98a having a section in the shape of a channel with an open bottom. The upper ends 80c of the first set of elastic mounting segments 80 are fitted in the corresponding channel-shaped engaging portions 98a, in a manner similar to that shown in the embodiment of FIG. 17. The diagram of FIG. 27 shows an embodiment in which the engaging recesses or openings 100a formed in the fixing member 100 are fitted on the protrusions 80e provided at the upper end surfaces 80c of the first set of elastic mounting segments 80. This embodiment corresponds to that shown in FIG. 18.

As will be fully understood, the embodiments shown in FIGS. 23 to 27 are also such that even when the external force F is applied to the assembly after the main body 32 is mounted on the panel 24, the ends of the first set of elastic mounting segments 80 are prevented from coming off the mounting hole 46.

The embodiments shown in FIGS. 28 to 31 have also the essential parts similar to those of the embodiments shown in FIGS. 23 to 26. The embodiment of FIGS. 28 and 29 has the cylindrical pillar portion 34 quite the same in shape as that of the embodiment of FIGS. 13 and 14, and hence, that of the embodiment of FIGS. 23 and 24. As a result, the cylindrical pillar portion 34 is mounted in the mounting hole 46 of the panel 24 in exactly the same way in the embodiment under consideration as in the preceding embodiments. The fixing member 102 and the inner part of the vessel or decoration ring member 48 of the embodiment under consideration, however, has a somewhat different shape from that in the embodiment of FIG. 23. In the embodiment under consideration, the fixing member 102 with a central window 102a has at the inner periphery thereof a plurality of engaging portions 102b adapted to engage the engaging steps 82b of the second set of elastic mounting segments 82, and engaging portions 102c adapted to engage the ends 80c of the first set of elastic mounting segments 80 for preventing the inward tilting of the first set of elastic mounting segments 80. The fixing member 102 is thus integrally secured by such means as caulking or insertion molding to the thin lower end part 104 of the vessel or decoration ring member 48. By forcibly pressing the vessel or decoration member 48 with this construction against the free end of the cylindrical pillar portion 34, the engaging portions 102b of the fixing member 102 make their way into the space S between the steps 82b of the second set of elastic mounting segments 82 and the panel surface, thus securing the vessel or decoration member 48 to the cylindrical portion 34. At the same time, the holes of the engaging portions 102c of the fixing member 102 are fitted in engaged relation with the corresponding ends 80c of the first set of elastic mounting segments 80.

The engaging portions 102c of the fixing member 102 may be replaced by the flat and substantially T-shaped engaging portions 102d as shown in FIG. 30 and in addition, recesses 80d at the upper ends 80c of the first set of elastic mounting segments 80 for the purpose of engagement as shown with reference to the embodiment of FIG. 25. Further, instead of the engaging portions 102c, engaging portions 102e with a channel-shaped section as shown in FIG. 31 may be provided so that, as in the embodiment of FIG. 26, the engaging portions 102c may engage the corresponding upper ends 80c of the first set of elastic mounting segments 80.

It will be easily seen that in the embodiments of FIGS. 28 to 31 also, as in the preceding embodiments, the upper ends of the first set of elastic mounting segments 80 are prevented from coming off the mounting hole 46 even if the main body 32 is subjected to external force F after it is fitted with the cylindrical pillar portion 34.

A lamp display unit to which the mounting device according to the present invention as described above is applied is shown in FIGS. 32 to 36.

Figure 33:
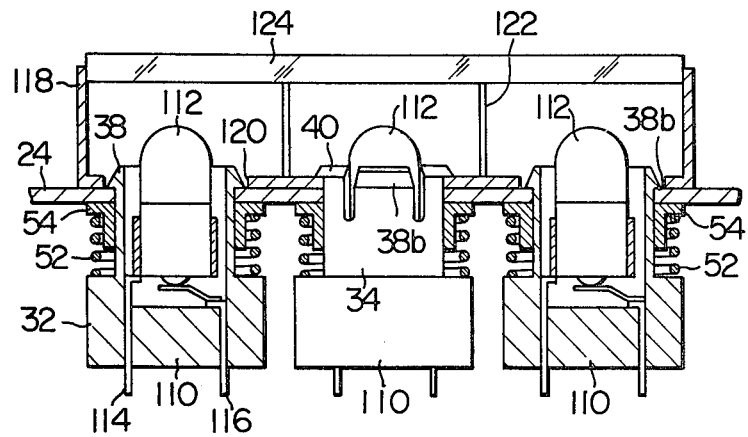
FIG. 33 is an elevational sectional view showing an embodiment of the invention including a plurality of the same indication lamps as that shown in FIG. 32.
Figure 34:
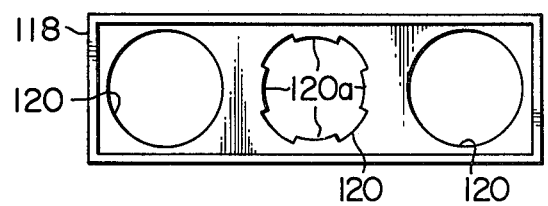
FIG. 34 is a plan view of the panel shown in FIG. 33.
Figure 35:
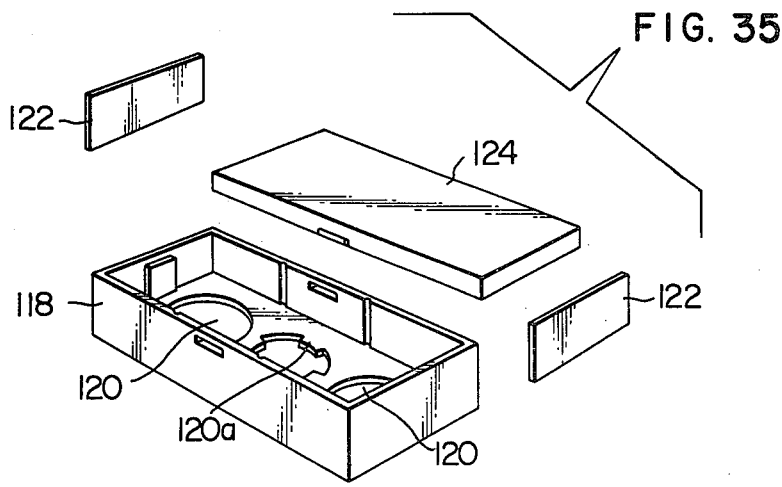
FIG. 35 is an exploded perspective view of the panel shown in FIG. 34 and related members.

In FIG. 32, numeral 110 shows a single-lamp display unit having a casing substantially identical to that shown in FIG. 4. A cylindrical pillar portion 34 with an open upper end is formed on the main body 32 containing a display lamp 112 and connectors 114, 116 (FIG. 33). The protruded cylindrical pillar portion 34 has an upper end formed with a plurality of slots 36, which in turn form a first set of elastic mounting segments 38 and a second set of elastic mounting segments 40 formed with protruded steps 38b and 40b respectively on the outside of the upper ends thereof. Upon insertion of the protruded cylindrical pillar portion 34 into the mounting hole 46 of the panel 24 from the back side thereof, the protruded steps 38b of the first set of elastic mounting segments 38 are adapted to engage the peripheral part of the front side of the panel 24. Numeral 54 shows a pressure member which receives urging force from the spring 52 when being fitted on the protruded cylindrical pillar portion 34. With the cylindrical pillar portion 34 inserted in the mounting hole 46 of the panel 24, the pressure member 54 exerts pressure upon the back side of the panel 24 thereby to secure the display unit 110 to the panel 24, as already explained above.

The diagram of FIG. 33 shows a multiple-lamp display unit comprising a plurality of single-lamp display units with the above-mentioned construction and a single frame for containing display lamps of all the display units 110 with a display lens. Numeral 118 shows a frame, the bottom wall of which is provided with through holes 120 through which the ends of the cylindrical pillar portions 34 of the display units 110 may be freely inserted. The periphery of at least one of the through holes 120 may be formed with a plurality of engaging protrusions 120a for mating with the protruded steps 40b of the second set of the elastic mounting segments 40 of the display unit 110. The frame 118 is mounted on the front side of the panel 24 by fitting the engaging protrusions 120a in engaged relation in the space S between corresponding protruded steps 40b and the front side of the panel 24. In view of the fact that the second set of elastic mounting segments 40 are inwardly flexible, the frame 118 may of course be mounted easily by pressing it against the panel 24. Numeral 122 shows shield plates for separating the inside of the frame 118 into a plurality of compartments associated with respective display lamps of the display units 110, and numeral 124 a lens member mounted on the open upper end of the frame 118.

Figure 36:
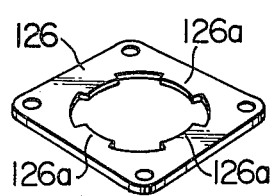
FIG. 36 is a perspective view of an engaging member.

Another embodiment of the invention is shown in FIG. 36. Numeral 126 shows an engaging member having a plurality of engaging portions 126a on the inner periphery thereof. In this embodiment such a frame member is utilized in which all the through holes 120 have no engaging protrusions 120a. The engaging member 126 is mounted on appropriate one of the through holes 120 integrally with the frame 118, in use, in such a position that the engaging portions 126a are located on the periphery of the associated through hole 120, so that the engaging portions 126a engage the protruded steps 40b of the second set of elastic mounting segments of the display unit 110. As an alternative, the engaging member 126 is not integrated with but separately provided from the frame 118. In such a case, the ends of the protruded cylindrical pillar portions 34 of the respective display units 110 which have already engaged with the panel 24 are first loosely inserted into the corresponding through holes 120 of the frame 118, and then the engaging member 126 is fittingly engaged with the protruded steps 40b of the second set of elastic mounting segments at the free end of the cylindrical pillar portion 34 of selected at least one of the units 110, thereby holding securely the bottom wall of the frame 118 between the engaging member 126 and the panel 24.

Although the shown embodiment includes a plurality of display units 110, push button or toggle type operating switches may of course be substituted for or added to them for embodying the present invention with equal effect.

As will be seen from the foregoing description, according to the invention, provision of plural same units 110 and frames for two, three or four lamps is sufficient to assemble any type of multi-lamp unit in use, and therefore the invention is very useful in inventory or process control.

Figure 37:
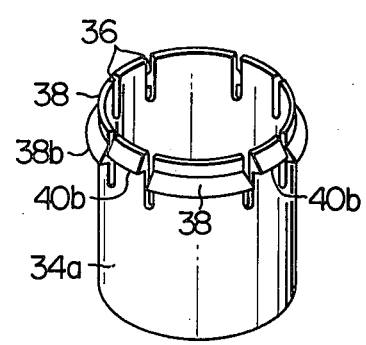
FIG. 37 shows an embodiment of a cylindrical mounting member.
Figure 38:
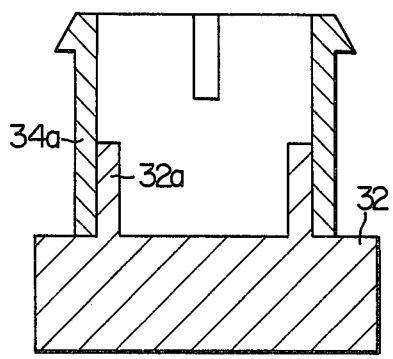
FIG. 38 is an elevational sectional view showing the cylindrical mounting member combined with the main body of a casing.
Figure 39:
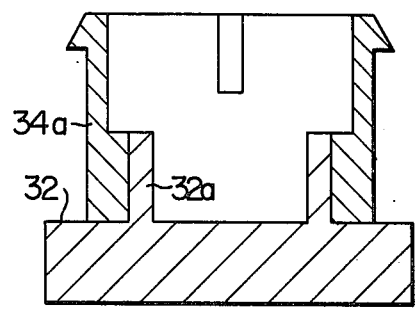
FIG. 39 is an elevational sectional view showing another cylindrical mounting member combined with the main body of a casing.

Still other embodiments of the invention are illustrated in FIGS. 37 to 39. For electrical devices such as a push button switch generally mounted on a panel, several sizes of the panel mounting hole, for example 22 mm$\phi$, 25 mm$\phi$ and 30 mm$\phi$, are specified in accordance with, for example the international electrical standards of IEC. For this reason, several types of devices having different mounting parts corresponding to different sizes of mounting holes have to be provided, which necessitates the provision of several kinds of devices according to the prior art.

In the embodiment under consideration, however, the body 32 of the apparatus is used in common, while several types of cylindrical mounting members 34a are provided separately, and they are used in the desired combination to achieve advantages in respect of inventory control and materials cost.

A perspective view of the cylindrical mounting member 34a is shown in FIG. 37. The main body 32 is separately provided and formed with a cylindrical portion 32a. In actual use, the cylindrical member 34a is fitted on and integrally bonded by a bonding agent or like to the cylindrical portion 32a of the main body 32. The manner in which this assembly is used is exactly the same as that of the preceding embodiments. Preferably, the inside diameter of the bottom part of the cylindrical mounting member 34a is substantially identical to the outside diameter of the cylindrical portion 32a of the main body 32.

The above-mentioned constructions make it possible to mold the apparatus body 32 with a low-cost thermosetting resin material, thereby contributing to a reduced product cost. Further, several types of cylindrical members 34a with different outside dimensions or mounting means may be provided to meet the user's requirement that any of the cylindrical members 34a be used with the body 32, thus achieving a great advantage in inventory control.

I claim:

1. A device for mounting on a supporting panel means comprising:

an electrical apparatus enclosed in a casing of an insulating material;

said casing including a main body portion with a cavity containing component elements of said electrical apparatus and a hollow pillar-shaped portion extending from one external side of said main body portion, the hollow portion of said pillar-shaped portion being formed along a longitudinal axis of said pillar-shaped portion and communicating with said cavity of said main body;

said hollow pillar-shaped portion having its free end divided into a plurality of segments by a plurality of slots extending along said axis from said free end;

a first and a second set of segments in a predetermined number being selected among said plurality of segments, each of said first and said second set of segments having its free end integrally formed with a portion protruded outward thereby to form a step on the opposite end of said protruded portion to said free end, said protruded portion of each of said first and said second set of segments being arranged such that when said free end of said hollow pillar-shaped portion is registered with and pressed against a mounting hole preformed in the supporting panel means, in use, in order to fix said casing onto said panel means, said protruded portion will be pressed inwardly by the periphery of said mounting hole, thereby causing the segment associated with said protruded portion to bend elastically inward and such that said segment associated with said protruded portion will be restored to its original position after said protruded portion has passed through said mounting hole;

bias means located between said one external side of said main body and said step of each of said first set of segments for exerting a force to keep away said one external side of said main body and said supporting panel means from each other after said protruded portion of each of said first and said second set of segments has passed through said mounting hole in use, whereby said supporting panel means will be pressed into contact with said step of each of said first set of segments; and the length of said protruded portion of each of said second set of segments along said axis being shorter than that of said protruded portion of each of said first set of segments so that, in use, when said supporting means is pressed into contact with the step of each of said first set of segments, a gap will be formed between the supporting panel means and the step of each of said second set of segments.

2. A device according to claim 1, in which said hollow pillar-shaped portion has a substantially circular section intersecting a plane extending perpendicular to said longitudinal axis.

3. A device according to claim 1, in which said hollow pillar-shaped portion has a substantially triangular section intersecting a plane extending perpendicular to said longitudinal axis.

4. A device according to claim 1, in which said hollow pillar-shaped portion has a substantially rectangular section intersecting a plane extending perpendicular to said longitudinal axis.

5. A device according to claim 1, in which said hollow pillar-shaped portion has a substantially polygonal section intersecting a plane extending perpendicular to said longitudinal axis.

6. A device according to claim 1, in which said bias means comprises spring means which is to be interposed, in use, between said supporting panel means and said one external side.

7. A device according to claim 6, in which said spring means is supported on an annular member which is fitted on said hollow pillar-shaped portion.

8. A device according to claim 1, in which said bias means comprises an annular member of an elastic material which is fitted on said hollow pillar-shaped portion.

9. A device according to claim 1 in combination with said supporting panel means, said device being mounted in said mounting hole in said panel, further comprising a hollow decoration member which is engaged with said free end of said hollow pillar-shaped portion, said decoration member being formed with an inwardly-extending flange portion at an end thereof so that, during assembly, said protruded portion of each of said second set of segments is pressed and inwardly bent by the inner periphery of said flange portion thereby permitting said protruded portion to pass said flange portion along the length of said protruded portion when said end of said hollow decoration member is pressed against said free end of said hollow pillar-shaped portion after said casing has been mounted in said mounting hole of said supporting panel means, each of said second set of segments being restored to its original position after the passage of said protruded portion, thereby holding securely said flange portion in said gap.

10. The combination according to claim 9, in which said flange portion is formed with recesses at respective portions thereof corresponding to the free ends of said first set of segments, so that said free ends of said respective first set of segments are allowed to freely pass said corresponding recesses of said flange.

11. The combination according to claim 9, in which said decoration member includes a plurality of engaging portions which are correspondingly engaged with said respective free ends of said first set of segments of said hollow pillar-shaped portion so as to prevent said first set of segments from inward tilting.

12. The combination according to claim 11, in which said engaging portions are protrusions with recesses formed on an inner wall of said decoration member, with said free ends of said first set of segments fitting into said recesses of said protrusions correspondingly.

13. The combination according to claim 11, in which said engaging portions are T-shaped protrusions with legs thereof fixedly secured to an inner wall of said decoration member, with said legs of said T-shaped protrusions fitting into corresponding recesses formed in said respective free ends of said first set of segments.

14. The combination according to claim 11, in which said engaging portions are protrusions with recesses formed on an inner wall of said decoration member, with respective protrusions formed at said free ends of said first set of segments fitting into said recesses correspondingly.

15. The combination according to claim 11, in which said decoration member includes a hollow cylindrical member and an annular engaging member, said annular engaging member being formed with said flange portion having said plurality of engaging portions.

16. The combination according to claim 15, in which said engaging portions are protrusions with recesses formed on an inner periphery of said annular engaging member, with said free ends of said first set of segments fitting into said recesses of said protrusions correspondingly.

17. The combination according to claim 15, in which said engaging portions are substantially T-shaped protrusions with the legs thereof fixedly secured to an inner periphery of said annular engaging member, with said legs fitting into recesses respectively formed at said free ends of said first set of segments.

18. The combination according to claim 9, further comprising a fixing member which is interposed between said hollow pillar-shaped portion and said decoration member and which is so arranged that, during assembly, said free ends of said second set of segments are permitted to elastically bend inward, said free ends of said first set of segments being prevented by said fixing member from elastically bending inward.

19. The combination according to claim 18, in which said fixing member has an outer periphery which is similar to the inner periphery of said hollow pillar-shaped portion in shape of the section in a plane perpendicular to said axis but smaller in dimension than said inner periphery of said hollow pillar-shaped portion to thereby form a predetermined allowance therebetween, said outer periphery of said fixing member being formed with protruded engaging portions at positions corresponding to said first set of segments respectively, said fixing member being fitted in the cavity of said hollow pillar-shaped portion and engaging a stepped engaging portion formed on an inner wall of the free end of each of said first set of segments, thereby preventing the inward tilting of said first set of segments.

20. The combination according to claim 18, in which said decoration member includes a plurality of protrusions formed on its inner surface, said protrusions preventing said fixing member from coming off said hollow pillar-shaped portion.

21. The combination according to claim 18, in which said fixing member is formed with, at its inner surface, a plurality of protrusions with recesses, with said respective free ends of said first set of segments fitting into said recesses of said protrusions correspondingly.

22. The combination according to claim 18, in which said fixing member is formed with, at its inner surface, a plurality of T-shaped protrusions with legs thereof fixedly secured to said inner surface of said fixing member, with said respective legs fitting into corresponding recesses formed at said free ends of said first set of segments respectively.

23. The combination according to claim 18, in which said fixing member is formed with, at its inner surface, a plurality of protrusions with recesses, with respective protrusions formed at said free ends of said first set of segments engaging said recesses of said protrusions of said fixing member.

24. A device according to claim 1, in which said main body of said casing and said hollow pillar-shaped portion are made of an insulating material and formed integrally with each other.

25. A device according to claim 1, in which said main body of said casing and said hollow pillar-shaped portion are formed separately and fixedly attached to each other in use.

26. An assembly comprising:
an electrical apparatus enclosed in a casing of an insulating material mounted onto a supporting panel means by a mounting device;
said casing including a main body portion with a cavity containing component elements of said electrical apparatus and a hollow pillar-shaped portion extending from one external side of said main body portion, the hollow portion of said pillar-shaped portion being formed along a longitudinal axis of said pillar-shaped portion and communicating with said cavity of said main body;
said hollow pillar-shaped portion having its free end divided into a plurality of segments by a plurality of slots extending along said axis from said free end;
a set of segments in a predetermined number being selected among said plurality of segments, each of said set of segments having its free end integrally formed with a portion protruded outward thereby to form a step on the opposite end of said protruded portion to said free end, said protruded portion of each of said set of segments being arranged such that when said free end of said hollow pillar-shaped portion is registered with and pressed against a mounting hole preformed in the supporting panel means, during assembly in order to fix said casing onto said panel means, said protruded portion is pressed inwardly by the periphery of said mounting hole, thereby causing the segment associated with said protruded portion to bend elastically inward and such that said segment associated with said protruded portion is restored to its original position after said protruded portion has passed through said mounting hole;
bias means located between said one external side of said main body and said supporting panel means exerting a force to keep away said one external side of said main body and said supporting panel means from each other, thereby pressing said supporting panel means into contact with said step of each of said first set of segments; and
a hollow decoration member which is engaged with said free end of said hollow pillar-shaped portion, said decoration member including at least two legs extending further axially from an end thereof engaging said free end of said hollow pillar-shaped portion, each of said legs having at its end an outwardly-protruded portion, said hollow pillar-shaped portion being formed with, at its inner surface, a plurality of recesses at positions corresponding to the respective protruded portions of said legs so that the respective protruded portions of said legs engage said recesses correspondingly.

27. An assembly according to claim 26, in which said end of said decoration member is formed with a plurality of recesses for correspondingly receiving said respective protruded free ends of said set of segments.

28. An assembly according to claim 26, in which said hollow pillar-shaped portion has a substantially circular section intersecting a plane extending perpendicular to said longitudinal axis.

29. An assembly according to claim 26, in which said hollow pillar-shaped portion has a substantially triangular section intersecting a plane extending perpendicular to said longitudinal axis.

30. An assembly according to claim 26, in which said hollow pillar-shaped portion has a substantially rectangular section intersecting a plane extending perpendicular to said longitudinal axis.

31. An assembly according to claim 26, in which said hollow pillar-shaped portion has a substantially polygonal section intersecting a plane extending perpendicular to said longitudinal axis.

32. An assembly according to claim 26, in which said bias means comprises spring means interposed between said supporting panel means and said one external side.

33. An assembly according to claim 32, in which said spring means is supported on an annular member fitted on said hollow pillar-shaped portion.

34. An assembly according to claim 26, in which said bias means comprises an annular member of an elastic material fitted on said hollow pillar-shaped portion.

35. An assembly according to claim 26, in which said main body portion of said casing and said hollow pillar-shaped portion are made of an insulating material and formed integrally with each other.

36. An assembly according to claim 26, in which said main body portion of said casing and said hollow pillar-shaped portion are formed separately and fixedly attached to one another during use.

37. A device extendable through an opening in a support panel means for securing electrical apparatus and the like to said support panel means, and comprising:

an insulated casing including a main body portion and an attached, hollow pillar-shaped portion extending outwardly from said main body portion, said main body portion including a cavity for supporting component elements of said electrical apparatus, with said cavity in joint communication with a hollow portion of said pillar-shaped portion;

said hollow portion including a free end having a plurality of segments and a plurality of slots, wherein a separate one of said slots is positioned between each pair of said adjacent segments, with said segments and said slots each extending substantially parallel to a longitudinal axis of said hollow, pillar-shaped portion;

said free end including a predetermined number of first and second sets of segments, with each of said first and second sets of segments having integrally attached protruding portions extending substantially outwardly from said free end of said pillar-shaped portion forming a plurality of step-like surfaces;

said free end of said pillar-shaped portion having a cross-sectional configuration similar to and slightly larger than said opening in said support panel means, whereby said free end will be inwardly compressed during insertion of said integrally attached protruding portions through said opening in said support panel means;

said protruding portions of said first set of segments having a first length as measured along said longitudinal axis and said protruding portions of said second set of segments having a second length as measured along said longitudinal axis, with said first length being greater than said second length; and bias means extending between said main body portion of said casing and said step-like surfaces of said first set of segments for biasing only said step-like surfaces of said first set of segments into contact with said support panel means, while maintaining a gap between said further step-like protrusions of said second set of segments and said support panel means.

* * * * *